Figure 1B:
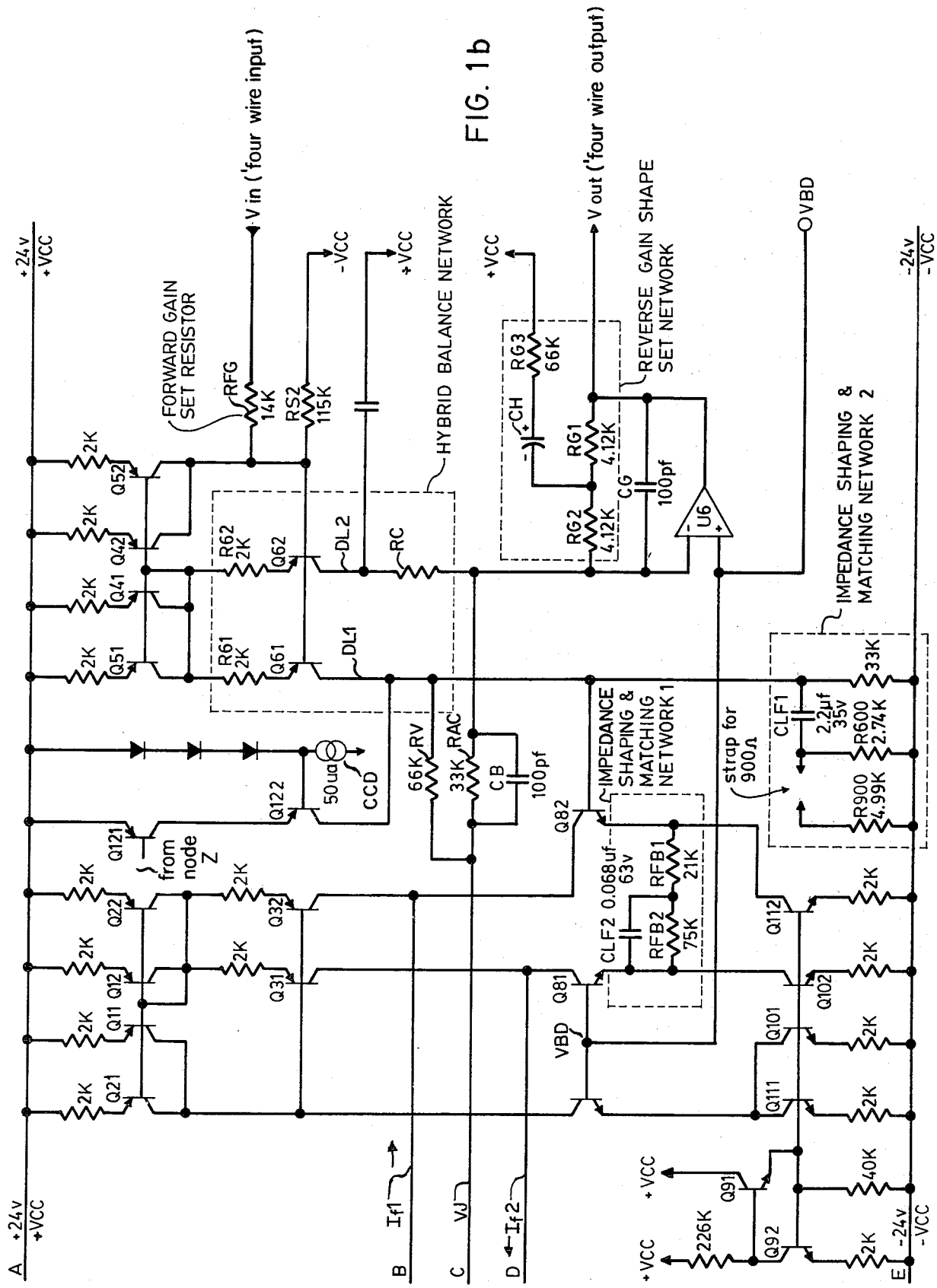

United States Patent [19]

Davis et al.

[11] 4,292,478
[45] Sep. 29, 1981

[54] INTERFACE CIRCUITS

[75] Inventors: John C. H. Davis, Oak Ridges; Krishnaswamy Natarajan, Bramalea, both of Canada

[73] Assignee: Plessey Canada Limited, Downsview, Canada

[21] Appl. No.: 42,530

[22] Filed: May 25, 1979

[51] Int. Cl.³ .............................................. H04B 1/58
[52] U.S. Cl. .............................................. 179/170 NC
[58] Field of Search ........ 179/170 NC, 170 R, 170 T, 179/170 D, 16 A, 16 AA, 16 F, 16 E, 18 F, 18 FA; 178/2 R, 3, 4.1 R, 70 R, 71, 73

[56] References Cited

U.S. PATENT DOCUMENTS

| | | |
|---|---|---|
| 3,530,260 | 9/1970 | Gaunt, Jr. .................... 179/170 NC |
| 3,700,831 | 10/1972 | Aagaard et al. ............. 179/170 NC |
| 3,886,322 | 5/1975 | Colardelle et al. ........... 179/170 NC |
| 4,064,377 | 12/1977 | Regan ......................... 179/170 NC |
| 4,086,447 | 4/1978 | Schindler et al. ........... 179/170 NC |

Primary Examiner—Thomas A. Robinson

[57] ABSTRACT

Interface circuitry is provided between a pair of lines, on the one hand, and an input to and output from other equipment on the other hand. The interface circuitry will commonly be used between 'tip' and 'ring' lines of a telephone connection and office telephone equipment but is not limited to the telephone art. The interface equipment provides independently controllable and adjustable impedances to 'longitudinal' and transverse voltage changes on the pair of lines, means for transferring signals from the pair of lines to the output line and means for transferring signals from the input line to the pair of lines.

30 Claims, 2 Drawing Figures

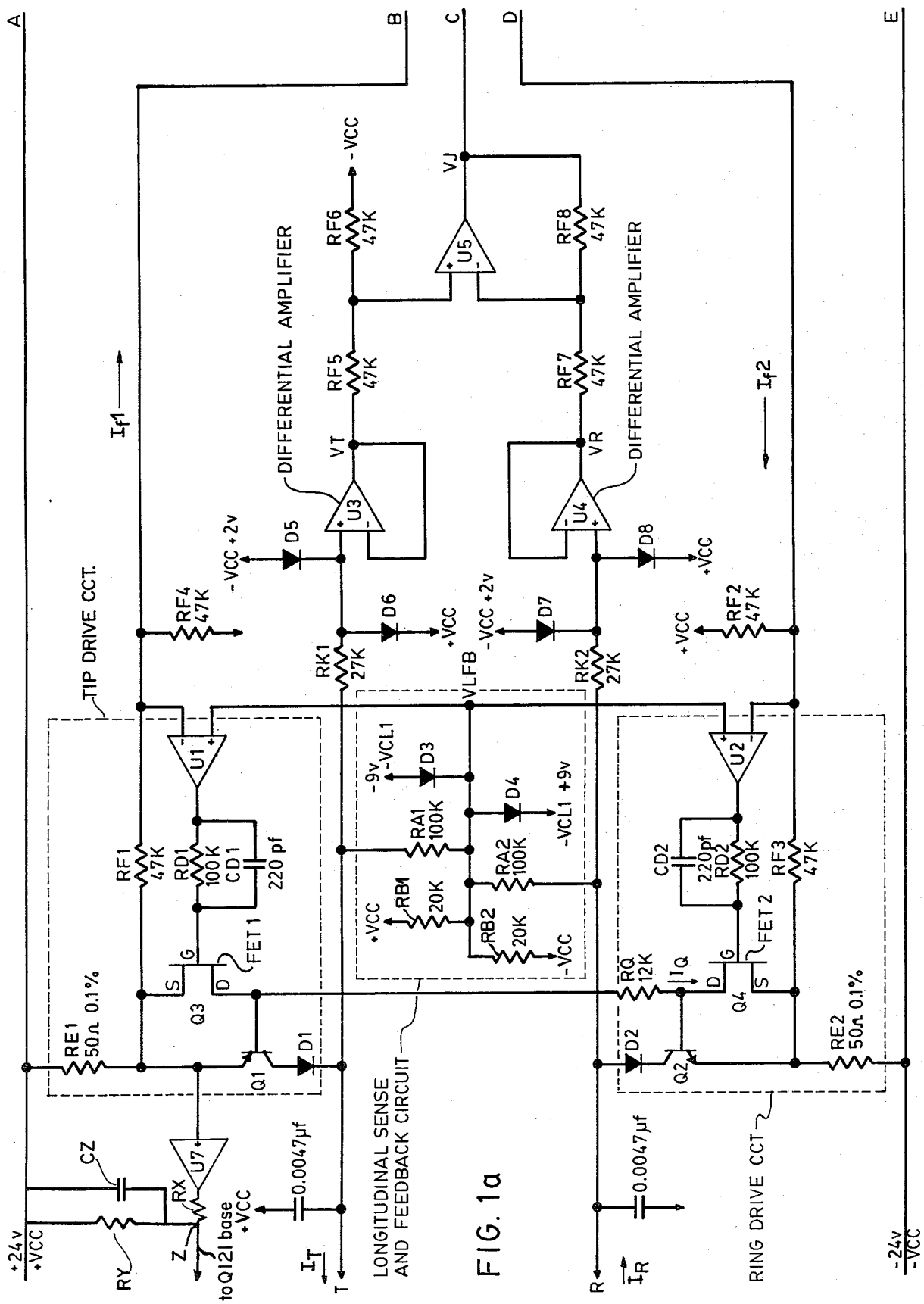

INTERFACE CIRCUITS

This invention relates to an interface between a pair of lines, on the one hand; and an input to and an output from other equipment, on the other hand.

The most common application of the inventive circuitry is believed to be as an interface between a pair of telephone lines (which are usually referred to as "tip" and "ring" lines) on the one hand, and an input to and an output from a telephone exchange, on the other hand. However the scope of the invention is not limited to its use in a telephone application.

The term "transistor" as used in this application and claims (where not otherwise qualified) is intended to include both: a solid state device having, emitter, collector and base, often referred to as a 'bi-polar' transistor; and also a field effect transistor having a source, gate and drain. The term 'power terminals' of a transistor, as used herein, refers to the emitter and collector of a bi-polar transistor or the source and drain of a field effect transistor. The term 'control terminal' of a transistor, as used herein, refers to the base of a bi-polar transistor or the gate of a field effect transistor. In referring to the power terminals reference is sometimes made to the "low impedance" power terminal by which is meant the power terminal where a small change in potential causes a relatively high change in current through the transistors between the power terminals. In a bi-polar transistor the emitter is the 'low impedance' power terminal and in a field effect transistor the source is the low impedance power terminal. In contrast the term 'high impedance' power terminal refers to the collector of a bi-polar transistor or the drain of a field effect transistor since at such terminals a change in potential causes a relatively small change in current through the relevant transistor between the power terminals.

The 'main conducting path' of a transistor refers herein to the path between the power terminals of a transistor in its conducting direction.

Where reference is made herein to a "constant current source" and a "constant current drain" the term "constant current" is used as accepted in the art rather than in any absolute sense. Thus the term "constant current" is used herein to refer to a source or drain whose current characteristics vary in narrow limits, a negligible amount for the purposes of the circuit, over the practical range of variation of impedance and other circuit characteristics, in the circuitry connected thereto.

The circuitry provided, although specifically designed for solid state operation, accomplishes (in its telephone application), in most respects, the same functions as a conventional telephone hybrid employing wire wound transformers.

The circuitry (in its telephone application) differs from the conventional telephone hybrid not only in that it is designed for solid state operation but that it is designed for the co-operation with a digital telephone exchange. However, the digital portion and the analogue-to-digital and digital-to-analogue portion of the telephone exchange form no part of the invention or of the circuitry described herein.

In general and without here distinguishing between the various facets of the invention, the circuitry includes:

A. Solid state means for providing voltage and current to each of a pair of lines being a conventional pair of lines such as, for example, for a telephone system, the pair being usually referred to as tip and ring lines. Such lines, in the telephone application, might be a pair of subscribers' lines, a pair of truck lines or an equivalent tip and ring pair for other kinds of signal and/or data transmission over a range of frequencies. The solid state means and controls therefor are designed to provide the required voltage and current for operation of equipment connected to the pair of lines.

B. Solid state means are designed to sense changes in "longitudinal voltage" in a pair of lines powered as described in paragraph A above. By "longitudinal voltage" is meant a potential which is the average or sum of the potential on the pair of lines relative to a datum. The sensing means is designed in combination with control means (to an adjustable degree which is a design criterion) to alter the current flow through the solid state amplifying devices in response to the longitudinal voltage detected. The usual arrangement is, responsive to a positive alteration in longitudinal voltage on the lines, to decrease the current through a solid state device to the positive line of said pair and to increase the current through a solid state device to the negative line of said pair, the normal direction of currents in the tip and ring lines being outward on the positive line from the circuitry and inward on the negative line to the circuitry. The circuitry is arranged so that a negative alteration in the longitudinal voltage has the opposite effect. This causes the tip and ring lines to appear like a normal impedance and thus the reaction of the inventive solid state circuit to a change in longitudinal voltage resembles the reaction of a conventional telephone hybrid (using transformers instead of solid state devices) to such a change in the longitudinal voltage. The impedance of the circuitry as "seen" by the lines for longitudinal voltage is thus adjustable.

C. Solid state means are designed without use of transformers to sense changes in "transverse voltage" across a pair of lines such as the pair of tip and ring lines powered as described in paragraph A above. By "transverse voltage" is meant the potential difference between the two lines. The sensing means is designed in combination with control means (to an adjustable degree which is a design criterion) to alter the current flow through the solid state amplifying devices in response to the transverse voltage detected. The usual arrangement is, responsive to an increase in potential difference between the positive and negative lines, to decrease the current through both solid state amplifying devices and thus to decrease the current in the connected lines in the normal current direction outward from the circuitry on the positive line and inward to the circuitry on the negative line. The circuitry is arranged so that a decrease in potential difference between the positive and negative lines has the opposite effect. The reaction of the inventive solid state circuit to a change of transverse voltage is thus designed to resemble the reaction of a conventional telephone circuit hybrid (using transformers instead of solid state devices) to such change. The circuitry as "seen" by the tip and ring lines (or by equivalent lines for a different application), for transverse voltage, or voltage between the lines appears like a normal impedance and is adjustable.

D. It is one of the features of the invention that the circuitry is designed so that adjustment of the circuit response to longitudinal voltage changes may be made substantially independently of adjustment of the circuit response to transverse voltage changes, and vice versa.

This may also be considered as saying that the impedance as "seen" by the tip and ring lines (or equivalent) to longitudinal and transverse voltages may be independently selected.

E. Signals impressed across the tip and ring lines (or equivalent) appear as transverse voltage which are detected by the means for sensing transverse voltage. Such impressed signals will, in many applications be A.C. signals within the audio range. However the invention is equally applicable to impressed signals which are D.C. or which are A.C. signals of frequencies above the audio range. Means are provided for deriving an output signal from such detection. The output signal is provided along a line for transmission to the central telephone equipment and is analogous to the output signal of the four wire portion of a hybrid.

F. The detection of the transverse voltage is, as described previously, used to provide a control signal to vary the current flow in the lines. In accord with the inventive circuitry an input signal (analogous to the input from the four wire portion of a hybrid) is superimposed upon the last mentioned control signal so that the current flow through the solid state devices not only is controlled in accord with the transverse voltage on the line but is controlled in accord with the input signal. Thus the current flow in the pair of lines carries the input signal which may therefore be detected by equipment connected to the tip and ring lines. Such input signal is frequently A.C. in the audio range but the circuitry is operable if the signal is D.C. or of frequency well above the audio range.

G. From paragraphs E and F above it will be obvious that the input signal, creating a corresponding change of current flow on the line, will create a resultant change in the potential difference between the lines which would, in turn, tend to be detected as an output signal. The circuitry however provides means for cancelling wholly or partially the component of the output signal which results from the input signal.

H. The circuit provides for the supply of power to the positive one of the lines from a positive voltage datum through a first drive transistor and a corresponding power connection from the negative one of the two lines through a second drive transistor to a negative voltage datum. The drive transistors may be bi-polar or FET and have their low impedance power terminals connected to the datums and their high impedance power terminals connected to the lines. Control of current flow in the two transistors controls the current and voltage on the lines. The two transistors and the controls therefor for transverse voltage control, longitudinal voltage control, for detection of the output signal and application to the lines of the input signal are substantially balanced, on positive and negative sides and it is an advantage of the inventive circuitry that this may be done.

I. Control for each of the drive transistors as discussed above is preferably provided by a circuit comprising a pair of control transistors each connected for conduction between a constant current source and a constant current drain. One of the control transistors is preferably constantly biased, the other biased in accord with a control signal. The low impedance power terminals of the control transistors are connected by an impedance which partially determines the characteristics of the control. The high impedance power terminal of one control transistor is connected to a current path designed to control current flow in one drive transistor and the high impedance power terminal of the other control transistor is connected to a current path designed to control the current flow through the other drive transistor. Thus the control signal to the control terminal of one control transistor alters the current flow in the main conducting paths of both control transistors (designed to be in amounts less than the design steady state current therein). Such alteration, in the collector-emitter currents of the control transistors, due to the constant current source and drain, results in alteration of the two control currents to the drive transistors. The control signal to the control terminal of the transistor is derived from a superposition of the signal varying as the transverse voltage across the lines and the input signal. The two current paths through the control transistors and to control the drive transistors are connected from voltage datums of the appropriate polarities over circuits which are similar so far as possible and which controls the flow through the transistors in similar amounts. Thus the current to control the two drive transistors is balanced so far as possible.

J. The circuitry previously described is designed, so far as possible, to be placed on an integrated circuit chip for compactness and inexpensive production. Exterior to the chip are such components as the two drive transistors and the adjustable control impedances which determine the response of the drive transistors to a control signal, or the control resistances which control the gain of the input and output signal.

K. The circuit is designed so that the gain for an output signal may be adjusted independently from the gain for an input signal and vice versa.

L. The circuit is concerned with longitudinal and transverse voltage control and with the transmission of output and the receipt of input signals. The circuitry herein described does not include the means for transmitting and receiving the switching and ringing signals nor does it deal with overload protection circuitry.

In drawings which show a preferred embodiment of the invention:

FIGS. 1a and 1b show the circuitry of such preferred embodiment and should be considered as a single drawing. The letters A, B, C, D and E indicate the connections required between the two sheets.

The terms "transistor" and "main conducting path in a transistor" have been previously defined.

In the drawings, conventional power connections for such devices as operational amplifiers and differential amplifiers are omitted as these are well known to those skilled in the art.

In the drawings FIGS. 1a and 1b show the circuitry in discrete form and preferred values for resistive and capacitive elements for controlling the tip and ring lines T and R for inserting on the tip and ring lines T and R the signal from the PBX or "four wire system", and for sending to the "four wire system" audio signals applied to the tip and ring lines. Although shown in discrete form it will be realized that the circuitry will, to the extent hereinafter discussed, preferably be provided on an integrated circuit chip.

The circuitry as shown is designed to provide a positive tip and a negative ring subscriber's line. However as will be obvious, the circuitry may equally be designated to provide negative tip and positive ring lines or may be designed to provide reversible polarity as in trunk lines.

The circuitry is as shown in FIGS. 1a and 1b. The feedback and control means to control the current and voltage on the tip and ring lines in response to longitudinal voltage and transverse voltages will be described first.

Line A at positive datum +Vcc is connected to the tip line T through RE1 and the emitter-collector path, being the main conducting path of transistor Q1. The collector of Q1 is connected to tip line T through diode D1, poled to conduct toward the tip line T. The ring line R is connected to a negative datum −Vcc or E through diode D2 poled to conduct away from ring line R to the collector of transistor Q2 whose emitter is connected through RE2 to −Vcc. Thus the ring line R is connected to the negative voltage datum −Vcc through the main conducting path of transistor Q2. Thus the current through the main conducting paths of drive transistors Q1 and Q2 represents, respectively, the current going out on tip line T and coming in on Ring line R.

The collector-emitter current in Q1 is controlled by field effect transistor Q3 which is controlled by operational amplifier U1 connected as shown. The emitter-collector current in Q2 is controlled by field effect transistor Q4 which is controlled by operational amplifier U2 connected as shown.

Both Q3 and Q4, in the preferred embodiment, are depletion mode junction field effect transistors operating in the mode where a decrease and increase in bias voltage (in the correct polarity), between gate and source increases and decreases, respectively, current flow in the source drain circuit. It will be appreciated that field effect transistors operating in a different mode may equally be used with correct biasing.

Node VLFB which is controlled by the longitudinal voltage is clamped between ±9 V from the desired median voltage (here OV) between the tip and ring (T and R) lines by diodes D3 and D4 connected and poled as shown.

If the voltage on lines T and R alters to lower the median voltage therebetween, as represented by the potential at VLFB, a potential at node VLFB is applied to the direct input of U1 (the 'second input' thereof in some claims) and lowers the output of U1 which decreases the source—drain current in Q3 increasing the emitter-collector current through drive transistor Q1, being the current supplied on the Tip line T. Such decrease in potential at VLFB applied at the direct terminal of U2 (the 'first input' thereof in some of the claims) lowers its output and the gate of Q4. Lowering the gate of Q4 increases the current therethrough and decreases the collector-emitter current through drive transistor Q2. The increase of outward current on the Tip line T and decrease of inward current on the Ring line R is the effect which would be expected from the connection of a negative longitudinal voltage or voltages to both the tip and ring lines. As will be obvious, a positive voltage connected to both tip and ring lines has the opposite effect. The above discussion has proceeded on the basis that both tip and ring lines gained or lost voltage together, an ideal situation. However, it will be obvious that most exterior voltage changes impressed on the lines will appear as a combination of longitudinal and transverse voltage changes. For example a change in potential on one of the tip and ring lines, without change on the other will be detected by the circuitry of the invention as both a longitudinal and a transverse alteration.

Impedance control in relation to transverse voltages across the tip and ring lines and feedback in relation to such transverse voltages will now be discussed.

The tip line T is connected through resistance RK1 to the direct input of differential amplifier U3. The connection to this direct input is clamped between limiting voltage values, as shown, by the diodes D5 and D6 connected and poled as shown.

The ring line R is connected through resistance RK2 to the direct input of differential amplifier U4. The connection to this direct input is clamped between limiting voltage values, as shown, by the diodes D7 and D8 connected and poled as shown.

Amplifiers U3 and U4 connected as shown act as voltage followers. The outputs of the differential amplifiers are connected as shown: U3 through resistances RF5, RF6 to negative voltage datum −Vcc; and U4 through resistances RF7, RF8 to the output of differential amplifier U5 which is voltage VJ. The junction between RF5 and RF6 is connected to the direct input of differential amplifier U5 and the junction between RF7 and RF8 to the inverting input of differential amplifier U5. Thus the output VJ of the differential amplifier U5 is a function of the voltage differential between Tip and Ring lines, i.e. the transverse voltage. Elimination of any effect of longitudinal voltage changes on the output VJ is dependent upon the match between RF5 and RF7, RF6 and RF8, respectively. Moreover, if in addition RF5 equals RF6 and RF7 equals RF8, VJ corresponds in value, but for a constant term rather than proportionally to the differential voltage between Tip and Ring.

Voltage VJ is applied to the base of transistor Q82 (FIG. 1b). NPN Transistors Q82 and Q81 are connected to form a difference amplifier. The collectors of Q82 and Q81 are connected to the network comprised of Q21, Q11, Q12, Q22, Q31, Q32 as shown, which acts with datum Vcc as a constant current source for transistors Q81 and Q82. The emitters of Q81 and Q82 are connected to the network comprised of Q91, Q92, Q111, Q101, Q102, Q112 comprising in combination with negative datum −Vcc a constant current sink for transistors Q81 and Q82. The base of transistor Q81 is connected to a constant bias voltage VBD. The emitters of Q81 and Q82 are connected across a network of the resistances RFB1 and RFB2 and condenser CLF2 as shown, which network constitutes Impedance Shaping and Matching Network 1 and controls the transconductance of the transverse voltage feedback circuit. Thus, in the circuit so far described, an increase in the Tip-Ring voltage (or 'transverse' voltage) causes an increase in VJ. VJ is applied to the base of Q82 across a voltage divider comprising the 66 KΩ resistor on the one hand and the impedance represented by Impedance Shaping and Matching Network 2 on the other hand. Thus an increase and decrease in VJ, respectively cause an increase and decrease in emitter-collector current flow through Q82 and a decrease and increase in current flow through the counterpart transistor Q81. Since the transistors Q81 and Q82 have constant current sources and sinks these increases and decreases of current must flow through the Network 1 connected between the emitters of the transistors Q81 and Q82, connections to the collectors of the transistors Q81 and Q82 and other than those of the constant current sources. The collector of Q82 is connected to the inverting input of U1, to the emitter of Q1 through RF1 and from there to the positive datum through RE1. The collector of Q81 is connected to the inverting input of U2, to the emitter of Q2 through RF3 and from there to the negative datum through RE2. Thus an increase in voltage at the base of Q82 results in increased current flow to the collector of Q82 to the emitter of Q82, through Impedance Shaping and Matching Network 1 and causes a corresponding decrease in the collector-emitter current through Q81. The current If1 from Vcc to the collector of Q82 and the current If2 from the collector of Q81 to −Vcc must flow in the directions indicated by the arrows. If1 must not, when added to the constant current therein, exceed the capacities of Q82 to carry collector-emitter current and If2 must not exceed the steady state current through Q81. The circuit as designed however provides current If1 through RE1 and RF1 on the one hand, (controlling the drive of transistors Q1) and IF2 through RF3 and RE3 on the other hand, (controlling the drive of transistor Q2), which are substantially equal in magnitude, resulting in substantially equivalent controls on the drive currents at Q1 and Q2. The impedance response, with frequency, of the circuit is achieved by a combination of Impedance Shaping and Matching Network 2 acting on the input signal VJ and the Impedance Shaping and Matching Network 1 forming the transconductance of the difference amplifier circuit composed of Q81 and Q82 and its connections. It will be noted that as the frequency of the signal VJ increases the impedance of CLF1 in network 2 decreases and the proportion of VJ applied to the base of Q82 is less giving a rising impedance (as seen from the Tip and Ring lines) with rising frequency. On the other hand, the circuit comprising RFB2, RFB1 and CLF2 represents an impedance which reduces with higher frequency resulting in a reducing impedance (as seen from the Tip and Ring lines) with increasing frequency. The values of these two effects respectively increasing and decreasing the feedback are, with the values chosen in the specific embodiment in the preferred embodiment designed to provide approximate values for impedances presented by the circuit to the T-R lines as follows:

300 ohms at D.C. and appearing as 600 ohms (or 900 ohms as selected) in series with 2.2 microfarads of capacitance in the frequency range of 300 Hz to 3400 Hz.

However the two circuits may be designed to provide any reasonable relationship of impedance to frequency required.

Although the above described circuitry shows a fixed potential at the base of one transistor (here Q81) and a variable potential at the base of the other transistor (here Q82), it will be obvious that, alternatively, a signal controlled by VJ may be applied to one of the transistors (say Q82) and a signal controlled by −VJ (i.e. varying in the opposite sense to VJ) may be applied to the other transistor (say Q81). In general the circuitry including Q81, Q82 may be operated with suitable biases and supplies, where the potential between the bases of Q81 and Q82 varies with VJ, the control signal. Where a control signal or a signal varying with VJ is applied to the bases of both transistors Q81 and Q82, then circuits functionally equivalent to Impedance Matching and Shaping Network 2 must be provided between the base of each of Q81 and Q82 and ground, in the event that such impedance matching and shaping feature is desired.

In the operation of the circuitry just described, increase of voltage between T and R is detected at difference amplifiers U3, U4 and U5 resulting in VJ becoming more positive. VJ more positive increases the collector-emitter current through Q82 causing a corresponding decrease in collector-emitter current through Q81. Increase of collector-emitter current through Q82 increases If1 in the direction shown and decrease of collector-emitter current through Q81 increase If2 in the direction shown. Increase in If1 across RF1 tends to lower the potential at the inverting input of U1 (sometimes referred to as the first input of this amplifier or control in the claims), to raise the output of U1 increasing the source-drain current in Q3. Increase in source-drain current in Q3, decreases the emitter-base current of Q1 which causes a greater decrease in the emitter-collector current of Q1. The emitter-collector current of Q1 is of course the current in Tip line T. Increase of IF2 across RF3 tends to raise the potential at the inverting input of U2, (sometimes referred to as the second input of this amplifier or control in the claims), to lower the output of U2 increasing the source drain current in Q4. Increase in source-drain current in Q4 decreases the base-emitter current of Q2 which causes a greater decrease in the collector-emitter current of Q2. The collector-emitter current of Q2 is of course the current in Ring line R.

Decrease of potential across the tip and ring lines has of course the opposite effect, that of increasing currents through Q1 and Q2 and in the Tip and Ring lines.

Thus, with the circuitry described, the tip and ring currents in the direction shown fall and rise responsive respectively to increasing and decreasing transverse voltage potential across the tip and ring lines, presenting an impedance as 'seen' by the tip and ring lines which may be adjusted by selection of the parameters of the Impedance Matching and Shaping Networks 1 and 2.

It has been noted, and should be repeated, that the adjustment of the feedback and circuit in response to variations in transverse voltage across the tip and ring lines is independent of the adjustment in response to longitudinal voltage on the tip and ring lines, and vice versa.

It will be noted that the amplifier U1 receives at its inverting input feedback through If1 but also negative feedback from the voltage drop due to the emitter-collector current of Q1 across RE1 and receives at its direct input feedback from the longitudinal voltage sensing circuit. U2 receives corresponding feedbacks at its inverting and direct terminals. This exact control of tip and ring currents is achieved by the illustrated interdependent connections. Further it is within the scope of the invention to provide, for tip and ring lines which are to reverse polarity (as in a trunk line), a duplicate set of drive transistors, control transistors and control circuitry for each of the tip and ring lines and switches to allow reversal of the tip and ring polarities, as required.

The transmission of signals appearing on the Tip and Ring lines to form the signal Vout (what is known as the 'four wire output') (for transmission as the four wire output to circuitry not shown) will now be discussed. Variation in voltage on the Tip and Ring lines will be detected by the amplifiers U3, U4 and U5 and will appear as variation on the transverse voltage detection signal VJ and is applied over the 33 KΩ resistor RAC to the inverting input of amplifier U6 and to its Reverse Gain Shape Set Network comprising RG1, RG2, RG3, CH CG. The direct input of U6 has a constant bias. Accordingly the output of U6 is provided to the Vout line or 'four wire output' for transmission to a PBX, A/D convertor or other equipment. The gain at U6 is determined by the resistances RG1 and RG2, capacitor CG and the connection to Vcc through CH and RG3.

The circuitry for supplying the signals to the inventive circuitry from the 'four wire input' will now be discussed. Such signal is received along the line marked Vin, is called the 'four wire input' and is applied in magnitude determined by RFG/RS2 to the collectors of transistors Q42, Q52 of one side of the compensating current mirror comprised of transistors Q41, Q51 on one side and Q42, Q52 on the other side, and transistors Q61, Q62.

The emitter-collector current induced in Q42, Q52 is the same (in accord with the conventional design of this current mirror) as the emitter-collector current in Q41, Q51. The parameters of the circuits comprising Q61 and Q62 are designed, in the preferred embodiment, so that the current from Q41, Q51 is substantially equally divided between the two collector lines DL1 and DL2. The signal on DL1 appearing as a voltage across Impedance Matching and Shaping network 2 is superposed on the voltage VJ and the superposed voltages applied to the base of Q82 and thus the signal Vin contributes to the magnitude of If1 and If2 to control Q3 and Q4 and the current flow on the tip and ring lines T and R. Thus the currents on the tip and ring lines are controlled in accord with the signal Vin (i.e. the 'four wire input') and the signals appearing on Vin may thus be detected by telephone equipment connected to the tip and ring lines.

The circuitry is designed to prevent, or minimize, the 'echo' effect resulting from the transmission of Vout of the signal from Vin. Such cancellation or approximate cancellation occurs through the circuitry shown. It will be noted that the variation in voltage at the base of Q82 resulting from the signal at Vin causes corresponding variation in the tip and ring voltages which is detected by U3, U4 and U5 and results in a consequent change in VJ which appears at the inverting input of U6. This change is however compensated for at the negative input of U6 by the fact that the current through Q61 is equalled by the current through Q62 so that the current into the inverting input of U6 resulting from the voltage at Vin is exceedingly small. The time lag for the signal of Vin to transfer its effect through If to alter VJ is small enough that the currents coming in both directions to the inverting input of U6 may be considered as occurring substantially simultaneously. With proper selection of the parameters of the circuit, this cancellation (of effects of Vout from Vin) may be made substantially complete for a given impedance value. The circuitry parameters shown are designed for substantially complete cancellation at 600Ω and 900Ω.

The transistors Q121 and Q122 are used to effect current limiting. The output of U7 is equal to the voltage drop across the resistor RE1. A fraction of the voltage is applied to the base of Q121.

The desired proportion of the U7 ouput is obtained by connection of U7 output over resistance RX to the base of Q121 and resistance RY and capacitance CZ between the base of Q121 and Vcc.

When 50ma current flows in the load connected between T and R, causing 2.5 V drop in RE1, approximately 0.6 V gets applied to the base of Q121 and is applied to VFD through Q122. This current causes the voltage VFD to rise which in turn reduces the load current. By means of this negative feed back, the maximum current in the load is limited to 50ma or any chosen value determined by the choice of RX, RY and CZ.

The circuitry comprising Q91, Q92, Q111, Q101, Q102, Q112 forms a current mirror of conventional arrangement and in accord with the operation of this current mirror the 226KΩ resistor sets the current magnitude through Q81 and Q82.

The base of Q122 is connected downwardly to a constant current sink CCD shown as the overlapping circles for brevity.

It is desired to discuss the operation of the circuitry described, briefly, in relation to the completion of a telephone call so that it will be clear how the circuits shown relate to an overall telephone circuit.

In the event of the initiation of a call from equipment connected to the tip and ring lines T and R a receiver going off hook closing the hook switch (or equivalent occurrence across the tip and ring lines) reduces the impedance across the tip and ring lines from infinity to a finite value. This is detected by circuitry, not shown and not forming part of the present invention, preferably by detecting the change in current and voltage conditions across RE1 and/or RE2. (The amplifier U7 may be used for this purpose). The circuitry shown would then be connected to equipment which would handle the call. If the dialled digits are pulses, these would be detected at RE1 or RE2 by equipment not shown for use to operate switching to complete the call. If the dialled digits are audio tones then these would be transmitted over the circuitry as described from the Tip and Ring lines T and R over the four wire output "Vout" being detected as an A.C. variation in VJ. The completion of the connection to another subset is ordinarily signalled to the dialler by a tone, which would ordinarily be supplied by exterior equipment to the four wire input "Vin" and therethrough to the Tip and Ring lines T and R in the manner described, for signals on Vin. After completion of the connection, the conversation proceeds over the circuitry in the manner described with audio signals appearing on the tip and ring lines detected and sent on Vout and audio signals on Vin supplied to the tip and ring lines. Termination of the call is signalled from the remote end by a tone at Vin and at the near end by opening of the hook switch which will be preferably detected at RE1 and/or RE2 by equipment not shown and not related to the circuit but perhaps utilizing equipment such as U7. It is not felt necessary to go completely through the operation on a call from the remote end since the portions of such operation which are within and without the circuitry claimed will be clear from the discussion above. However it should be noted that the ringing current which would be applied to the Tip and Ring lines T and R, shown, to "ring" or signal at equipment connected thereto would be applied to the tip and ring lines by equipment not shown and not forming part of the present invention. Not shown also is protective circuitry designed to protect the circuitry shown and circuitry on the four wire side thereof from such voltage changes as those caused by lightning strikes and other surge or fault conditions.

The circuitry is designed to use as far as possible an integrated chip for the circuit components.

The devices which it is believed should be omitted from the integrated circuit are:

(a) the high voltage output transistors and resistors connected to the T and R leads, that would be called upon to support high voltages.

(b) the field effect transistors Q3 and Q4.

(c) impedance matching components, being the Impedance Matching and Shaping Networks 1 and 2, the gain control components, including: RA1, RA2, RB2 for longitudinal voltage control the 66K resistors, resistors RFG and RS2 for the input signal RG1, RG2, RG3 for the output signal; balance control components : the 33K resistor RAC, precision components RF5, RF6, RF7, RF8 and high voltage components RK1 and RK2.

(d) the bias current set 226K resistor that sets the operating current of the difference amplifier.

Thus it will be seen that the components which it is recommended be omitted from the integrated circuit chip are the ones likely to get high voltages and those that need to be outside due to system considerations.

It will be noted that the preferred embodiment uses bi-polar transistors for the drive transistors Q1 and Q2 and for the control transistors Q81 and Q82. It is however within the scope of the invention and the abilities of one skilled in the art to substitute FET's for either Q1 and Q2 or for Q81 and Q82, or for both pairs. Suitable modifications of the power and bias levels may be made by those skilled in the art for such substitutions. At the present time however we prefer to use bi-polar transistors.

We claim:

1. Means for providing power to a pair of lines comprising :

means for connecting a positive voltage datum over the main conduction path of a first transistor to create a relatively positive voltage on such line, means for connecting the other line over the main conduction path of a second transistor to a negative voltage datum, to create a relatively negative voltage on said other line, where the high impedance power terminals of said first and second transistors are connected to said lines and the low impedance power terminals are connected to said datums, means for controlling current flow through the respective conducting path of each of said transistors, means for obtaining a measure of the sum of the voltages on said pair of lines, means responsive to the said sum being more negative and more positive, for co-operating with said respective controlling means to increase and decrease, respectively, current flow along said main conducting path of said first transistor from said positive datum; and to decrease and increase current flow along said main conducting path of said second transistor to said negative datum.

2. Means as claimed in claim 1 wherein said first transistor is a PNP transistor having its emitter connected to the positive voltage datum and its collector to said one line, said second transistor is an NPN transistor having its collector connected to said other line and its emitter connected to the negative voltage datum.

3. Means for providing power to a pair of lines comprising:

means for connecting a positive voltage datum over the main conducting path of a first transistor to one of said lines, to create a relatively positive voltage thereon, means for connecting a negative voltage datum over the main path of a second transistor to the other of said lines to create a relatively negative voltage thereon, where the high impedance power terminals of said first and second transistors are connected to said lines and the low impedance power terminals are connected to said datums, control means for each of said transistors for controlling current flow therethrough, means for obtaining a measure of the difference of the voltages on said lines, means responsive to the difference being greater and less for decreasing and increasing respectively, current along said respective conducting paths.

4. Means as claimed in claim 3 wherein said first transistor is a PNP transistor having its emitter connected to the positive voltage datum and its collector connected to said one line, and said second transistor is an NPN transistor having its collector connected to said other line and its emitter connected to the negative voltage drum.

5. Means for providing an interface between a first pair of lines and input and output lines to carry signals from and to equipment comprising:

a first transistor having its main conductive path connecting a positive voltage datum to one of said first pair of lines, first control means connected to control the current flow along the main conducting path through said first device, a second transistor having its main conductive path connecting the other of said first pair of lines to a negative voltage datum, second control means connected to control the current flow along the main conducting path through said second device, where the high impedance power terminals of said first and second transistors are connected to said lines and the low impedance power terminals are connected to said datums, each of said first and second control means having a first and a second input and being designed and connected so that an increase in potential of the first relative to the second input tends to increase the current through main conducting path of the corresponding transistor, and vice versa, means for obtaining a measure of the sum of the potentials on said pair of lines, means for deriving a signal varying with said measure, means for applying said signal varying with said measure, to the second terminals of the first control means and the first terminal of the second control means, means for obtaining a measure of the differences of the potentials on said lines, means for deriving signals varying as the difference of potentials of said first and second lines, means for applying said signals to the first input of said first control means and the second input of said second control means.

6. Means as claimed in claim 5, wherein said first transistor is a PNP type transistor having its emitter connected to the positive voltage datum and its collector connected to said one of said lines, and said second transistor is an NPN type transistor and has its collector connected to the other of said lines and its emitter connected to said negative voltage datum.

7. Means for providing an interface between a pair of lines, on the one hand, and an input and output thereto and therefrom, on the other hand, comprising:

a first solid state amplifying device for controlling current flow from a positive voltage datum to one line of said pair, a control for said first amplifying device having first and second input terminals, a second solid state amplifying device for controlling current flow from said other line of said pair to a negative voltage datum, a control for said second amplifying device, having first and second input terminals, each of said controls being designed so that an increase and decrease in potentials at its first terminal relative to its second terminal tends respectively to increase and decrease, respectively, current flow through the corresponding amplifying device and being designed so that an increase and decrease in potentials at said second terminal relative to the first tends, respectively, to decrease and increase current flow through the corresponding amplifying device, means for deriving and applying, to the second input of said first device control and the first input of said second device control, signals of potential varying as the sum of the voltages on said pair of lines, means for deriving and applying to the first input of said first device control and the second input of said second device control a signal varying as the difference of the potentials of said line.

8. Circuitry comprising:

a pair of three terminal, solid state devices of the class consisting of : bi-polar transistors and field effect transistors, having their positive power terminals connected to respective constant current sources and their negative power terminals connected to constant current drains, an impedance network connecting the low impedance power terminals of said devices, means defining a first current path from a positive voltage datum to the high impedance terminal of one of said devices, said first current path being designed and connected to provide, along said path, current to said one device high impedance terminal, during conduction in said one device, means defining a second current path from a negative voltage drum to the high impedance power terminal of the other of said devices, said second current path being designed to receive current from said other device during conduction in said other transistor, means for applying a control signal to vary the potential difference between the control terminals of said devices.

9. Circuitry as claimed in claim 8 wherein said means for applying a control signal includes means for applying a signal varying therewith to the control terminal of at least one of said devices, and means including an impedance connected between the supply of said signal and said control terminal and an impedance connecting said control terminal to a voltage datum.

10. The circuitry of claim 8 in combination with a pair of telephone lines, wherein one of said three terminal solid state devices comprises an NPN transistor having its collector connected to said first current path and its emitter connected to said impedance network, and the other of said three terminal solid state devices comprises an NPN transistor having its collector connected to said second current path and its emitter connected to said second current path and its emitter connected to said impedance network.

11. The circuitry of claim 9 in combination with a pair of lines, wherein one of said three terminal solid state devices comprises a NPN transistor having its collector connected to said first current path and its emitter connected to said impedance network, and the other of said three terminal solid state comprises an NPN transistor having its collector connected to said second current path and its emitter connected to said impedance network.

12. The circuitry of claim 8 in combination with a pair of lines, a third three terminal solid state device having its main conducting path connected to conduct from a positive voltage datum to one of said pair of lines, a control for said third device, a fourth three terminal solid state device having its main conducting path connected to conduct from the other of said pair of lines to a negative voltage datum, a control for said fourth device, means for operating the control for said third device in accord with the current in said first current path, means for operating the control for said fourth device in accord with the current in said second current path, means for deriving a signal proportional to the difference in potentials on said lines, means for varying the potential between the control terminals of said first mentioned pair of said devices in accord with said potential difference proportional signal, said difference signal potential varying means and both said control means being designed and arranged so that increase in said potential between said lines causes increase of current flow in said first and second current paths and decrease of current through the main conducting paths of said third and fourth devices and wherein decrease of said potential between said lines has the respectively opposite effects.

13. Circuitry as claimed in claim 12 including means for deriving an output signal from said difference proportional signal.

14. Circuitry as claimed in claim 12 including means for superposing an input signal on said difference proportional signal before application to the respective controls whereby current flow through said third and fourth devices is determined by the superposition of said difference proportional signal and said input signal.

15. Circuitry as claimed in claim 13 including means for superposing an input signal on said difference proportional signal before application to the respective controls whereby current flow through said third and fourth devices is determined by the superposition of said difference proportional signal and said input signal.

16. The circuitry of claim 9 in combination with a pair of lines, a third three terminal solid state device having its main conducting path connected to conduct from a positive voltage drum to one of said pair of lines, a control for said third device, a fourth three terminal solid state device having its main conducting path connected to conduct from the other of said pair of lines to a negative voltage datum, a control for said fourth device, means for operating the control for said third device in accord with the current in said first current path, means for operating the control for said fourth device in accord with the current in said second current path, means for deriving a signal proportional to the difference in potentials on said lines, means for varying the potential between the control terminals of said first mentioned pair of said devices, in accord with said potential difference proportional signal, said difference signal potential varying means and both said control means being designed and arranged so that increase in said potential between said lines causes increase of current flow in said first and second current paths and decrease of current through the main conducting paths of said third and fourth devices; and wherein decrease of said potentials between said lines has the respectively opposite effects.

17. Circuitry as claimed in claim 12 wherein said third three terminal solid state device is a PNP transistor having its emitter connected to the positive voltage datum, and its collector connected to said one line and wherein the control therefor controls the emitter-base current in said PNP transistor, and wherein said fourth three terminal solid state device is and NPN transistor having its collector connected to said other line and its emitter connected to said negative voltage datum and wherein the control therefor controls the base-emitter current in said NPN transistor.

18. Circuitry as claimed in claim 16 wherein said third three terminal solid state device is a PNP transistor having its emitter connected to the positive voltage datum, and its collector connected to said one line and wherein the control therefor controls the emitter-base current in said PNP transistor; and wherein said second solid state amplifying device is an NPN transistor having its collector connected to said other line and its emitter connected to said negative voltage datum and wherein the control therefor controls the base-emitter current in said NPN transistor.

19. Circuitry as claimed in claim 12 wherein means are provided connecting said first current path and said third device designed so that an increase and decrease in current in said first current path causes a decrease and increase, respectively, of current in the main conducting path of said third device, and means are provided connecting said second current path and said fourth device so that an increase and decrease in current in said second current path causes a decrease and increase, respectively, of current in the main conducting path of said fourth device.

20. Circuitry as claimed in claim 19 wherein means are provided for varying the potential between said first and second device control terminals in accord witn an input signal superposed on said first mentioned control signal.

21. The circuitry of claim 19 including means for providing a signal varying as the voltage between said pair of lines, means responsive to said signal for controlling the potential between said first and second device control terminals in a sense to cause increase and decrease in current flow in said first and second current paths in response to an increase and decrease, respectively, in said voltage.

22. Circuitry as claimed in claim 12 including means for superposing an input signal on the signal derived from said potential difference before application of said derived signal between the control terminals of said first and second devices.

23. Circuitry as claimed in claim 16 including means for superposing an input signal on the signal derived from said potential difference before application of said derived signal between the control terminals of said first and second devices.

24. Circuitry as claimed in claim 17 including means for superposing an input signal on the signal derived from said potential difference before application of said derived signal between the control terminals of said first and second devices.

25. Circuitry as claimed in claim 18 including means for superposing an input signal on the signal derived from said potential difference before application of said derived signal between the control terminals of said first and second devices.

26. Means for co-operating with a pair of lines comprising:

means for connecting a positive voltage datum over the main conducting path of a transistor to one of said lines to create a relatively positive voltage thereon, means for connecting said other line over the main conducting path of a transistor to a negative voltage datum to create a relatively negative voltage on said other line, a control means connected to each of said transistors for controlling current flow therethrough, means for deriving control signals for each of said control means varying as the difference of the potentials on said lines, means for applying each of said control signals to the corresponding control arranged so that the control signal resulting from a larger potential difference between said lines results in a decrease in current flow through the corresponding transistor, and vice versa.

27. Means as claimed in claim 26 including means for deriving an output signal from said conrol signal.

28. Means as claimed in claim 26 including means for superposing an input signal on said control signal before application to the respective control whereby current flow through said transistors is determined by the superposition of said control signal and said input signal.

29. Means as claimed in claim 27 including means for superposing an input signal on said control signal before application to the respective controls whereby current flow through said transistors is determined by the superposition of said control signal and said input signal and wherein means are provided for at least partially cancelling the effect on said output signal of the superimposed signal.

30. In circuitry comprising a pair of lines and means for applying voltage and current thereto for operation of said lines, means for sensing the potential difference between said lines and providing a signal varying therewith, means for providing an output signal derived from said varying signal, means for providing a control potential in accord with said varying signal, means for utilizing said control potential to increase current flow to said lines when said potential difference decreases, and vice versa, means for superposing an input signal upon said control potential and means at least partly cancelling the effect of said input signal on said output signal.

* * * * *